US008596463B2

(12) United States Patent
Burkhard

(10) Patent No.: US 8,596,463 B2
(45) Date of Patent: Dec. 3, 2013

(54) METHODS TO INCREASE FORCE AND CHANGE VIBRATORY SEPARATOR MOTION

(75) Inventor: Alan Wayne Burkhard, Fort Thomas, KY (US)

(73) Assignee: M-I L.L.C., Houston, TX (US)

( * ) Notice: Subject to any disclaimer, the term of this patent is extended or adjusted under 35 U.S.C. 154(b) by 278 days.

(21) Appl. No.: 12/991,726

(22) PCT Filed: May 13, 2009

(86) PCT No.: PCT/US2009/043681

§ 371 (c)(1), (2), (4) Date: Nov. 9, 2010

(87) PCT Pub. No.: WO2009/140316

PCT Pub. Date: Nov. 19, 2009

(65) Prior Publication Data

US 2011/0060469 A1 Mar. 10, 2011

Related U.S. Application Data

(60) Provisional application No. 61/053,975, filed on May 16, 2008.

(51) Int. Cl.

| | |
|---|---|
| ***B07B 1/42*** | (2006.01) |
| ***B07B 1/28*** | (2006.01) |
| ***B07B 1/49*** | (2006.01) |
| ***G05B 13/00*** | (2006.01) |
| ***G05B 15/00*** | (2006.01) |

(52) U.S. Cl.

USPC ........ 209/365.1; 209/235; 209/309; 209/324; 209/369; 209/404; 700/280

(58) Field of Classification Search

USPC ......... 209/233, 235, 309, 325–327, 363, 364, 209/365.1, 365.4, 366.5, 367, 369, 404, 209/405, 509, 552, 555, 606, 629, 225, 320, 209/324, 350, 351, 366; 700/280

See application file for complete search history.

(56) References Cited

U.S. PATENT DOCUMENTS

| | | | | |
|---|---|---|---|---|
| 4,340,469 | A * | 7/1982 | Archer | 209/315 |
| 6,155,428 | A | 12/2000 | Bailey et al. | |
| 6,286,658 | B1 * | 9/2001 | Hufford | 198/766 |
| 6,513,664 | B1 * | 2/2003 | Logan et al. | 209/367 |
| 6,679,385 | B2 * | 1/2004 | Suter et al. | 209/367 |
| 7,278,540 | B2 * | 10/2007 | Stone et al. | 209/309 |

(Continued)

OTHER PUBLICATIONS

Examination Report issued in corresponding British Application No. GB1019382.9; Dated Feb. 27, 2012 (2 pages).
International Search Report from PCT/US2009/043681 dated Dec. 30, 2009 (4 pages).
Written Opinion from PCT/US2009/043681 dated Dec. 30, 2009 (4 pages).
Official Letter issued in corresponding British Application No. GB1308084.1; Dated Jun. 27, 2013 (2 pages).
Examination Report issued in corresponding British Application No. GB1019382.9; Dated Apr. 23, 2013 (1 page).
Examination Report issued in corresponding British Application No. GB1019382.9; Dated Feb. 1, 2013 (3 pages).

*Primary Examiner* — Crystal J Barnes-Bullock
(74) *Attorney, Agent, or Firm* — Osha Liang LLP

(57) ABSTRACT

A vibratory separator including a frame, a basket disposed on the frame, and a motor configured to impart a vibratory motion to the basket. Additionally, the vibratory separator includes an adjustable speed drive operatively coupled to the motor to control a vibratory motion imparted to the basket. Also, a method of processing drilling waste including generating a first vibratory motion on a vibratory separator using at least one motor, and adjusting the first vibratory motion using an adjustable speed drive to generate a second vibratory motion.

20 Claims, 7 Drawing Sheets

(56) References Cited

U.S. PATENT DOCUMENTS

| | | | | |
|---|---|---|---|---|
| 7,571,817 | B2 * | 8/2009 | Scott et al. | 209/413 |
| 8,312,995 | B2 * | 11/2012 | Dufilho et al. | 209/315 |
| 2001/0039719 | A1 | 11/2001 | Van De Rijdt | |
| 2005/0242002 | A1 | 11/2005 | Stone et al. | |
| 2008/0149538 | A1 * | 6/2008 | Burkhard | 209/225 |
| 2008/0149539 | A1 * | 6/2008 | Burkhard | 209/327 |
| 2009/0242466 | A1 * | 10/2009 | Burnett et al. | 209/555 |
| 2011/0114542 | A1 * | 5/2011 | Carr et al. | 209/235 |

* cited by examiner

METHODS TO INCREASE FORCE AND CHANGE VIBRATORY SEPARATOR MOTION

This application is a Section 371 National Stage entry from International Application No. PCT/US09/43681, filed 13 May 2009, which claims the benefit of U.S. Provisional Application No. 61/053975, filed 16 May 2008.

BACKGROUND

1. Field of the Disclosure

Generally, embodiments of the present disclosure relate to apparatuses and methods for separating solids from fluids. More specifically, embodiments of the present disclosure relate to apparatuses and methods for providing a vibratory motion to a vibratory shaker using adjustable speed drives.

2. Background Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

An additional purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling mud. Before the mud can be recycled and re-pumped down through nozzles of the drill bit, the cutting particulates must be removed.

Apparatus in use today to remove cuttings and other solid particulates from drilling fluid are commonly referred to in the industry as "shale shakers." A shale shaker, also known as a vibratory separator, is a vibrating sieve-like table upon which returning solids laden drilling fluid is deposited and through which clean drilling fluid emerges. Typically, the shale shaker is an angled table with a generally perforated filter screen bottom. Returning drilling fluid is deposited at the feed end of the shale shaker. As the drilling fluid travels down length of the vibrating table, the fluid falls through the perforations to a reservoir below leaving the solid particulate material behind. The vibrating action of the shale shaker table conveys solid particles left behind until they fall off the discharge end of the shaker table. The above described apparatus is illustrative of one type of shale shaker known to those of ordinary skill in the art. In alternate shale shakers, the top edge of the shaker may be relatively closer to the ground than the lower end. In such shale shakers, the angle of inclination may require the movement of particulates in a generally upward direction. In still other shale shakers, the table may not be angled, thus the vibrating action of the shaker alone may enable particle/fluid separation. Regardless, table inclination and/or design variations of existing shale shakers should not be considered a limitation of the present disclosure.

Preferably, the amount of vibration and the angle of inclination of the shale shaker table are adjustable to accommodate various drilling fluid flow rates and particulate percentages in the drilling fluid. After the fluid passes through the perforated bottom of the shale shaker, it can either return to service in the borehole immediately, be stored for measurement and evaluation, or pass through an additional piece of equipment (e.g., a drying shaker, centrifuge, or a smaller sized shale shaker) to further remove smaller cuttings.

The vibratory motion of typical shakers is generated by one or more motors attached to the basket of the shaker. In such shakers, motors and actuation devices may be placed on or be integral to the basket. The location of the motors facilitates the transference of forces generated by the motors to the basket by allowing a motors shaft to couple to an actuator, which transfers motion to the basket. However, while placing motors and actuation devices on the frame and support members of the vibratory separator may facilitate the transference of forces to the basket, the motors also create stress points on the basket. Over time, the stress points caused by the basket mounted motors may result in structural failure of the basket. Such structural failure may require taking the shaker out of service, thereby resulting in expensive and time consuming repairs.

Accordingly, there exists a need for a vibratory separator with actuator devices for providing forces and controlling direction of a vibratory motion imparted to a screen assembly.

SUMMARY OF THE DISCLOSURE

In one aspect, embodiments disclosed herein relate to a vibratory separator including a frame, a basket disposed on the frame, and a motor configured to impart a vibratory motion to the basket. Additionally, the vibratory separator includes an adjustable speed drive operatively coupled to the motor to control a vibratory motion imparted to the basket.

In another aspect, embodiments disclosed herein relate to a method of processing drilling waste including generating a first vibratory motion on a vibratory separator using at least one motor, and adjusting the first vibratory motion using an adjustable speed drive to generate a second vibratory motion.

In another aspect, embodiments disclosed herein relate to a vibratory separator including a frame, a basket disposed on the frame, and a motor configured to impart a vibratory motion to the basket. Additionally, the vibratory separator includes at least one rotary motor configured to impart a vibratory motion to the basket in a linear direction, and an adjustable speed drive operatively coupled to the at least one rotary motor to control a vibratory motion parameter of the vibratory separator.

Other aspects and advantages of the invention will be apparent from the following description and the appended claims.

DETAILED DESCRIPTION

Figure 1:
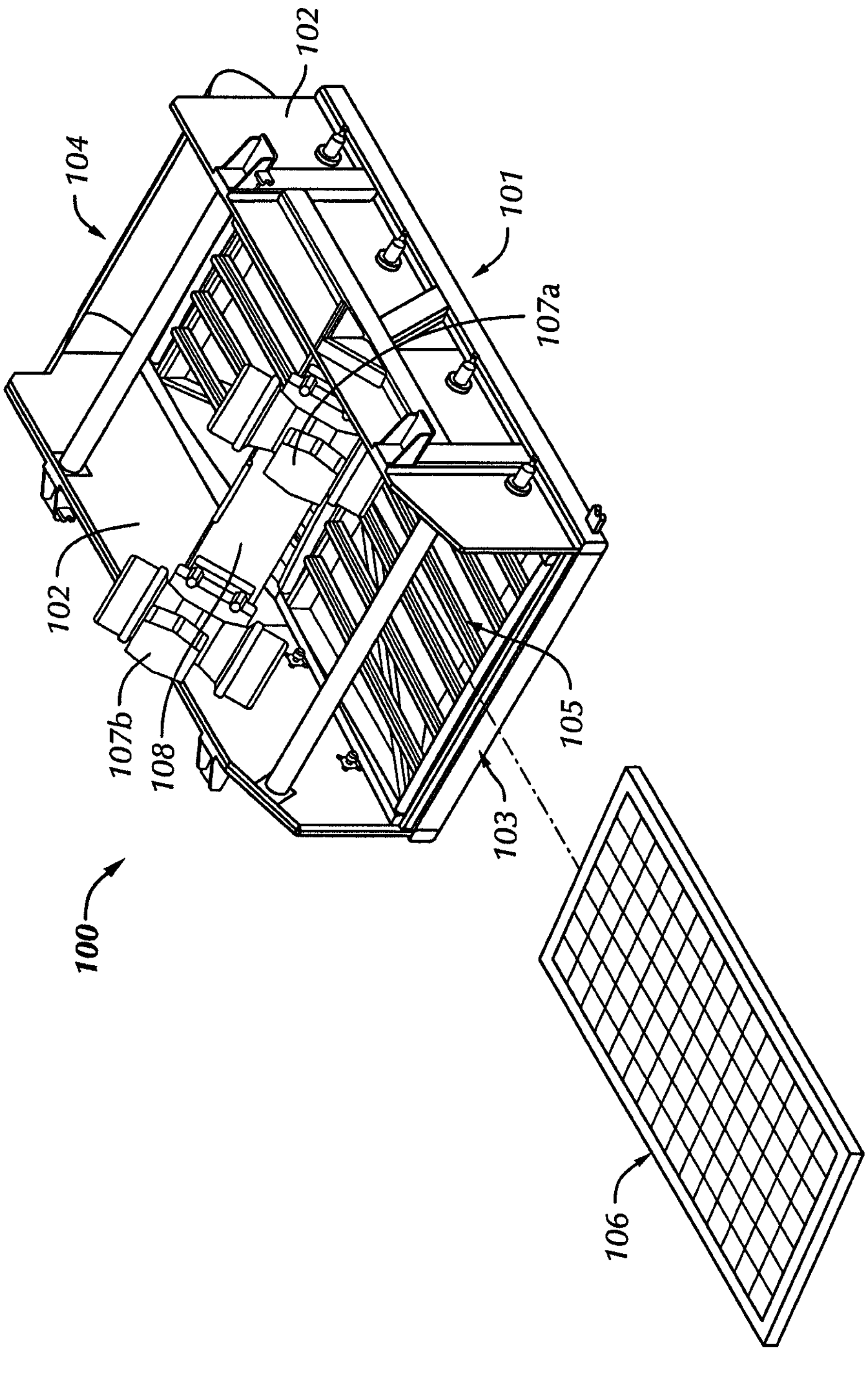
FIG. 1 is an isometric view of a vibratory separator in accordance with an embodiment of the present disclosure.
Figure 2:
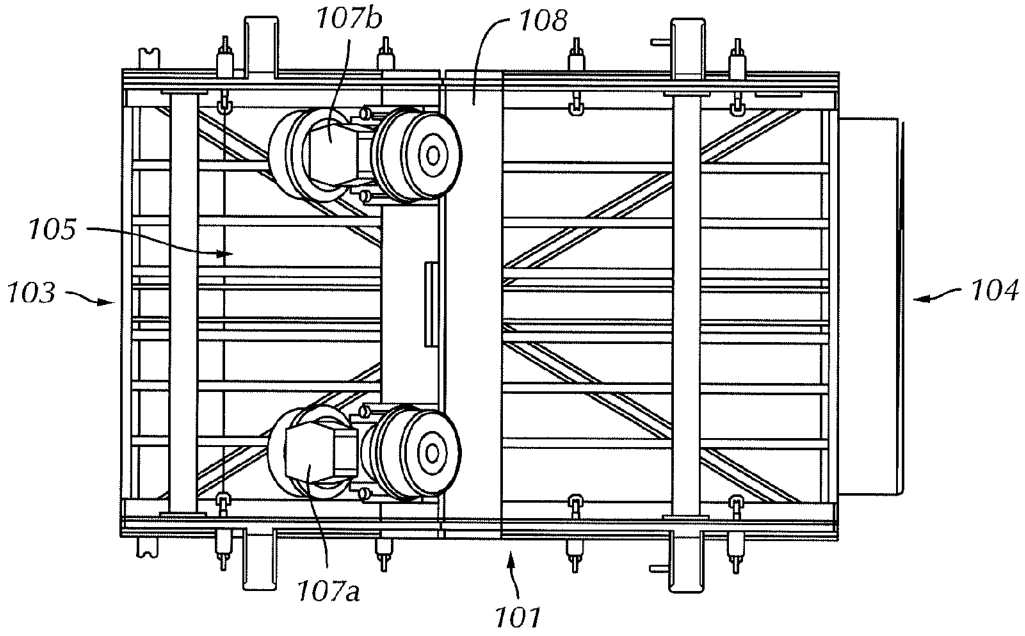
FIG. 2 is a top view of a vibratory separator in accordance with an embodiment of the present disclosure.
Figure 3:
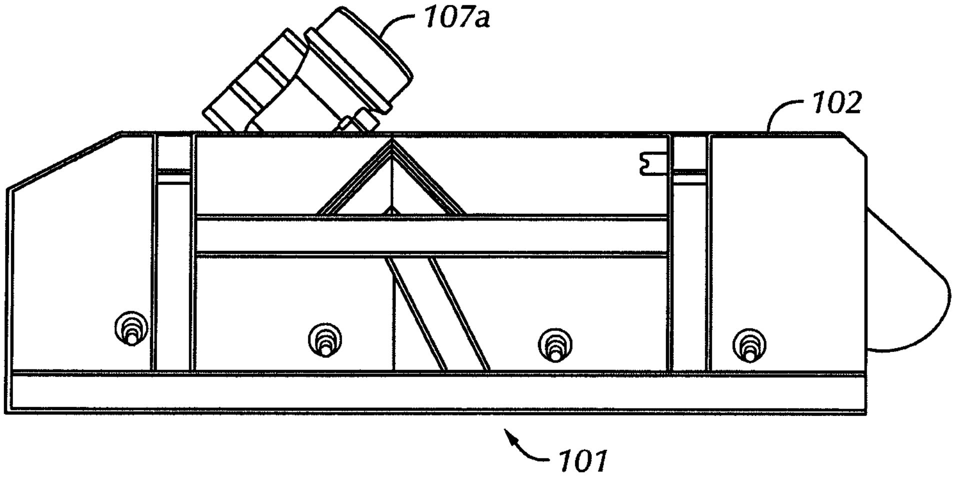
FIG. 3 is a side view of a vibratory separator in accordance with an embodiment of the present disclosure.

Generally, embodiments disclosed herein relate to apparatuses and methods for separating solids from liquids. Specifically, embodiments disclosed herein relate to apparatuses and methods using a variable frequency drive to control a direction of motion of a basket of a vibratory separator.

Referring initially to FIGS. 1-4, isometric, top, side and front views of a vibratory separator 100 in accordance with an embodiment of the present disclosure are shown. In this embodiment, vibratory separator 100 includes a frame 101, side walls 102, a discharge end 103, and an inlet end 104. Vibratory separator 100 also includes a basket 105 that holds a screen assembly 106. Operationally, as drilling material enters vibratory separator 100 through inlet end 104, the drilling material is moved along screen assembly 106 by a vibratory motion. As screen assembly 106 vibrates, residual drilling fluid and particulate matter may fall through screen assembly 106 for collection and recycling, while larger solids are discharged from discharge end 103.

In one embodiment, vibratory motion is supplied by a plurality of actuators 107*a* and 107*b* coupled to a support member 108 for imparting the vibratory motion to basket 105. Actuators 107 are driven by rotary motors (not shown) having shafts (not shown) coupled to identical unbalanced weights (not shown) attached to opposite ends of the shafts. The rotary motors may be operatively connected to a programmable logic controller ("PLC") (not shown) that may supply instructions to the motors, actuators 107, or other components of vibratory separator 100. The instructions to the motors and/or actuators 107 may include vibratory motion protocols that define a pattern of movement for moving basket 105 and/or frame 101. However, those of ordinary skill in the art will appreciate that PLCs are not a requirement for all applications, and as such, actuators may be independently controllable with or without a PLC.

Figure 4:
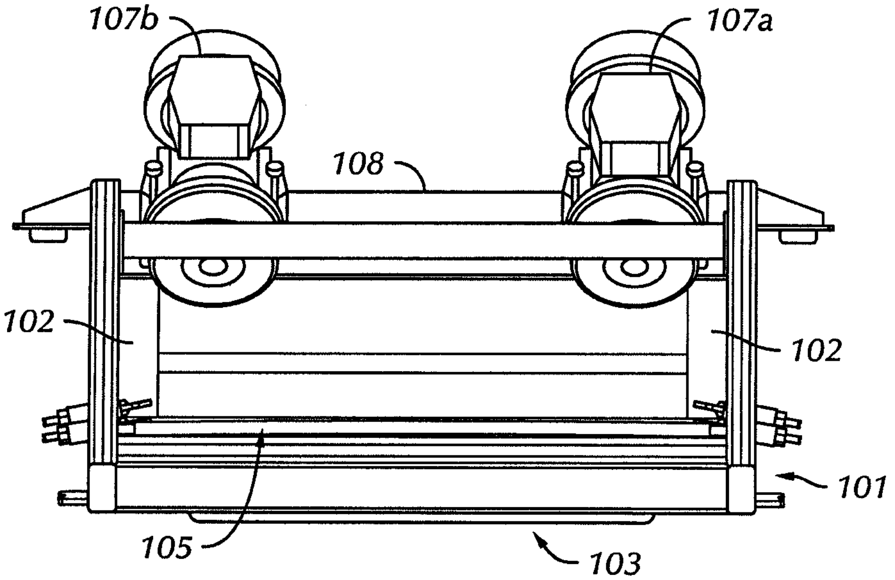
FIG. 4 is a front view of a vibratory separator in accordance with an embodiment of the present disclosure.
Figure 4A:
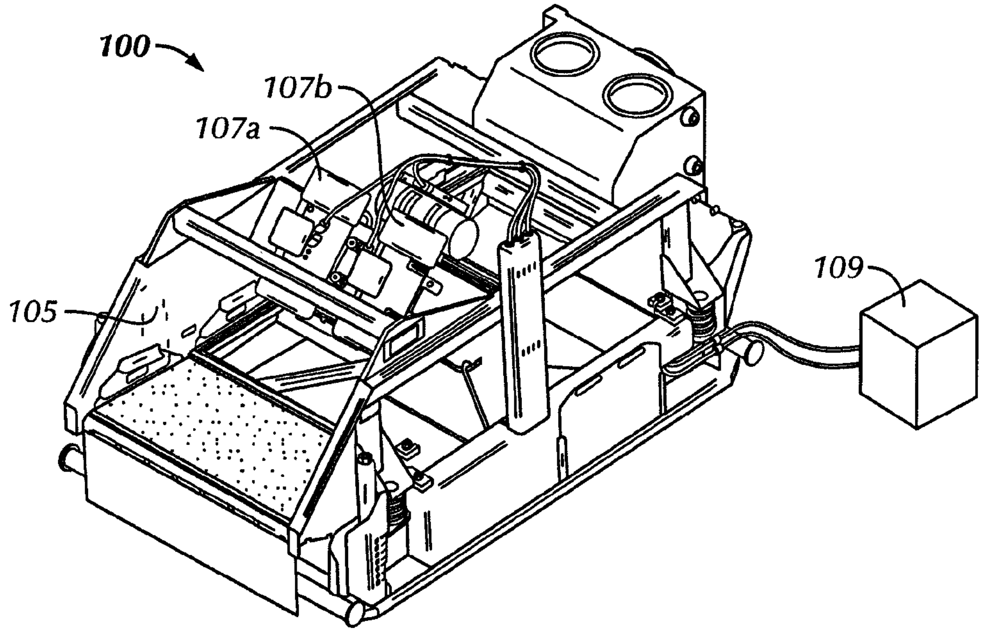
FIG. 4A is a perspective view of a vibratory separator in accordance with an embodiment of the present disclosure.

Referring to FIG. 4A, a perspective view of an alternative vibratory separator design according to embodiments of the present application is shown. Similar to FIGS. 1-4, FIG. 4A illustrates a vibratory separator having actuators 107*a* and 107*b* disposed thereon. Additionally, an adjustable speed drive 109 is disposed on vibratory separator 100, such that a direction of the motion imparted to basket 105 may be controlled. In this embodiment, adjustable speed drive 109 is a variable frequency drive, however, those of ordinary skill in the art will appreciate that other types of adjustable speed drives, such as adjustable frequency drives, variable speed drives, and inverter drives may also be used. Specific types of variable frequency drives may also include vector drives, such as closed loop, open loop, and direct torque control vector drives.

In certain embodiments, control of the adjustable speed drive may include stopping the weights along their path of rotation for a selected time interval. The process of stopping the weights at a selected location will be referred to herein as braking. To brake the motor, an adjustable speed drive may be used to provide a non-varying high direct current voltage to the motor, magnetizing the motor in one direction, thereby stopping the rotation of the stator for a selected time interval. By braking the motor, the frequency of the motor may be changed, thereby allowing for the force imparted in a specific direction or the direction of motion to be controlled.

Those of ordinary skill in the art will appreciate that depending on the size of the motors being controlled, the amount of braking required, and the breaking time required to produce a desired direction of motion, a particular type of adjustable speed drive 109 may be preferred. Generally, the embodiments discussed below are applicable to vector based variable frequency drives, however, apparatuses and methods using other adjustable speed drives known in the art may benefit from the present disclosure.

Figure 4B:
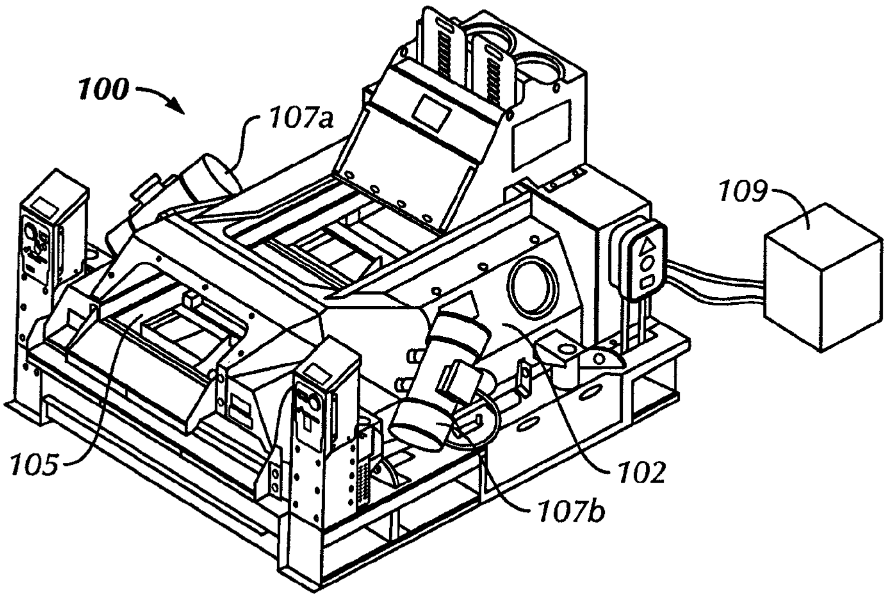
FIG. 4B is a perspective view of a vibratory separator in accordance with an embodiment of the present disclosure.

Referring to FIG. 4B, a perspective view of an alternative vibratory separator design according to embodiments of the present application is shown. Similar to FIGS. 1-4, FIG. 4B illustrates a vibratory separator having actuators 107*a* and 107*b* disposed thereon. However, in this embodiment, actuators 107 are disposed on the side walls 102 of the separator 100. As in FIG. 4A, an adjustable speed drive 109 is disposed on vibratory separator 100, such that a direction of the motion imparted to basket 105 may be controlled. Those of ordinary kill in the art will appreciate that the location of actuators 107 on vibratory separator 100 may vary according to the specific design of the vibratory separator 100. As such, actuators 107 used in accordance with embodiments disclosed herein may be located on side walls 102, along a support member (reference character 108 of FIG. 1), or underneath vibratory separator 100. Additionally, adjustable speed drive 109 may be disposed on vibratory separator 100, or in alternate embodiments, may be located proximate the separator 100.

Other components that may be disposed on separator 100 with adjustable speed drive 109 include shaft encoders, controllers, and user interfaces. Shaft encoders may be disposed proximate actuators 107 to provide speed information to adjustable speed drive 109. Shaft encoders may be particularly useful in vibratory separators 100 including closed-loop vector based variable frequency drives to provide near instantaneous speed measurements of the associated actuators. Controllers may also be disposed on vibratory separator 100 to allow for an adjustment in the operational parameters of adjustable speed drive 109. For example, in certain embodiments, adjustable speed drive 109 may include operation instructions as firmware in the speed drive, however, during operation, a user may want to change the operation of the speed drive. Because firmware is not easily controllable, adjustable speed drive 109 may include a controller capable of providing modified instructions, or otherwise directly modifying the operation of the speed drive. In still other embodiments, control of adjustable speed drive 109 and/or the controller may occur though manipulation of a user interface.

User interfaces may include manual switches configured to allow for adjustment of operational parameters of adjustable speed drive 109. However, in other embodiments, a user interface may include a digitized control panel configured to display the operational parameters of adjustable speed drive 109 and/or vibratory separator 100. Such a control panel may allow a user to manually change operational parameters of adjustable speed drive 109 or vibratory separator, or alternatively, may allow a user to input commands for a specific operational program to be run by a controller. Examples of operational parameters that may be modified through the user interface include motion type, brake frequency, direction control, braking points, rotation speed, etc. Examples of operational programs may include time based programs, such that the motion of a vibratory separator is varied over time, load based programs that determine cuttings flow rates and adjust a type of motion accordingly, or customized programs that allow a user to define a type of motion for a specified time increment or until a condition, such as an optimized cuttings flow rate is achieved. Those of ordinary skill in the art will appreciate that user interfaces may also include displays, controls, and other input/output components known in the art.

Figure 5:
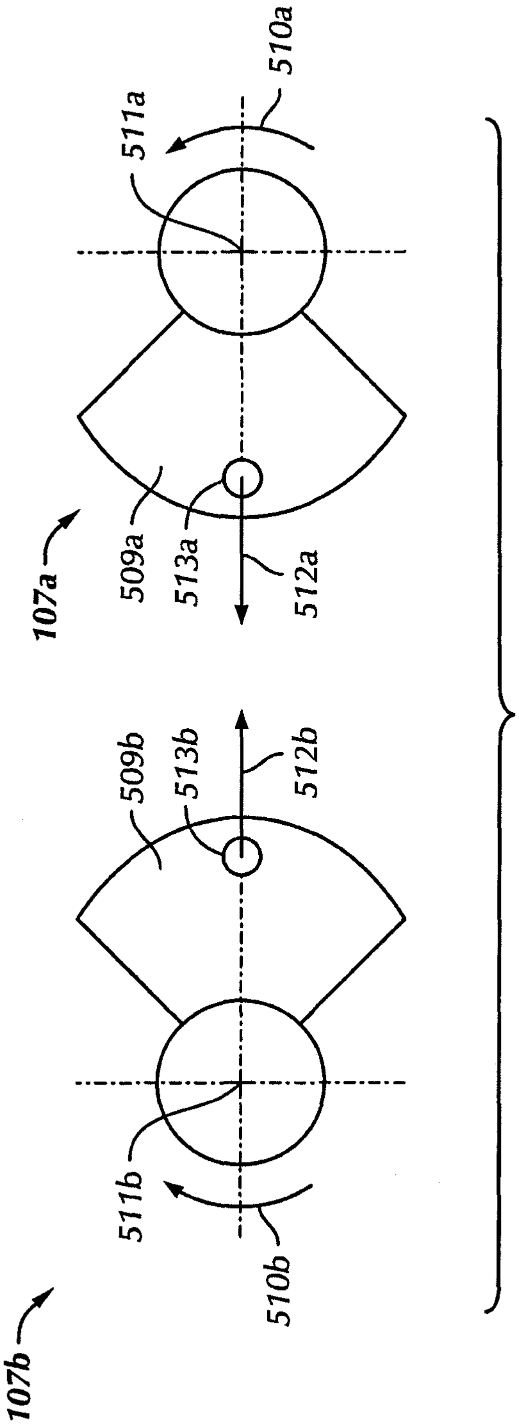
FIG. 5 is a schematic view of a rotational motion of actuators in accordance with an embodiment of the present disclosure.

Referring now to FIG. 5, a schematic view of a rotational motion of actuators during operation of a vibratory separator in accordance with one embodiment of the present disclosure is shown. Traditionally, vibratory separators have been configured to produce one type of motion (e.g., linear, round, or unbalanced elliptical). Such separators typically use one or more actuators disposed as described above to transmit the specified type of motion to a screen of the separator, thereby allowing the motion to be imparted to drill cuttings passing thereon However, recent separator design has allowed for additional actuators, such as a third motor, to be disposed on a vibratory separator, thereby allowing for multiple types of motion or more complex motion types (e.g., balanced elliptical) to be imparted to the drill cuttings. While the additional actuators may provide more complex motion types, or the ability to modulate the type of motion, the additional components increased the weight, complexity, and components of the separator. By replacing such additional motors with an adjustable speed drive, the motion produced by the actuators may be modulated, such that complex motion types may be produced without the additional actuators. Additionally, adjustable speed drives may allow for the generation of multiple motion types through the use of two, as opposed to three or more actuators.

In this embodiment, the instructions from the PLC to the motors may define a pattern of movement that constitutes a linear motion. In such an embodiment, the motors may drive actuators 107*a* and 107*b* thereby rotating unbalanced weights 509*b* and 509*a* in opposite directions 510*b* and 510*a* around their respective axes of rotation 511*b* and 511*a*. The rotation of unbalanced weights 509*b* and 509*a* produces centrifugal forces 512*b* and 512*a* as the centers of mass 513*b* and 513*a* rotate in equal planes relative to their respective axes of rotation 511*b* and 511*a*.

Figure 6:
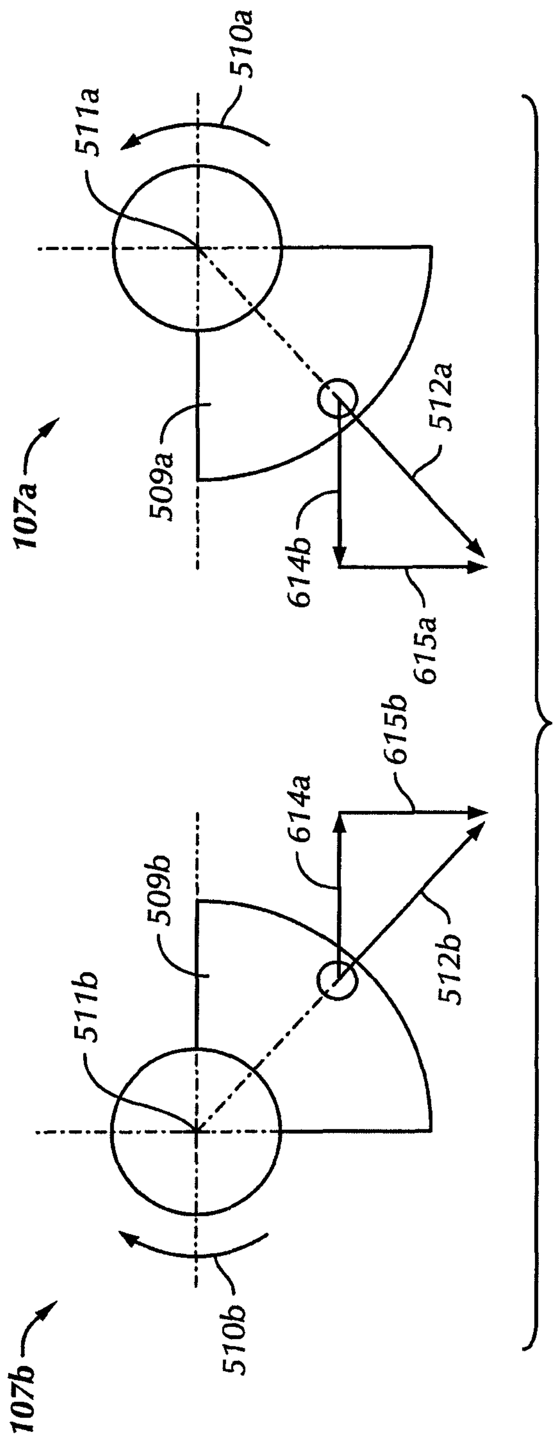
FIG. 6 is a schematic view of forces produced by rotational motion of the actuators during operation of the vibratory separator of FIG. 5.

Referring to FIG. 6, a schematic view of forces produced by rotational motion of the actuators during operation of the vibratory separator of FIG. 5 is shown. As unbalanced weights 509*b* and 509*a* rotate around their respective axis 511*b* and 511*a*, centrifugal forces 512*b* and 512*a* may impart a linear motion to a frame and/or basket of a vibratory separator. In this embodiment, centrifugal forces 512*b* and 512*a* include horizontal components 614*b* and 614*a* and vertical components 615*b* and 615*a*. Because the direction and speed of rotation of unbalanced weights 509*b* and 509*a* are opposite and equal, horizontal components 614bb and 614*a* cancel one another. As a result, the only forces acting on the frame and/or basket of the vibratory separator are the sum of the vertical components 615*b* and 615*a*. Because the sum of vertical components 615*b* and 615*a* vary from a positive maximum value to a negative maximum value, the motion imparted to the frame and/or basket is linear and reciprocating. Thus, as the frame and/or basket of the vibratory separator moves in accordance with the motion provided by actuators 107, the vibratory motion imparted to a corresponding screen assembly may be varied according to the rotational velocity of actuators 107.

By configuring a adjustable speed drive to one or more of actuators 107*a* or 107*b* the motion imparted by actuators 107*a* and 107*b* may be changed. For example, in one embodiment, the adjustable speed drive may be configured to electrically brake actuators 107*a* and 107*b*, such that the inertia of the of unbalanced weights 509*a* and 509*b* changes, thereby increasing acceleration in a desired direction. Such braking would thus result in momentarily stopping weights 509*a* and 509*b* during rotation, thereby changing the resultant motion according to the location in their rotation in which they are stopped. Because the change to the inertial energy of the weights is transferred to a shaft configured to the centerline of the actuators, the resultant change in motion is transferred to the deck of the vibratory separator.

Those of ordinary skill in the art will appreciate that by electrically applying a brake to one or more of actuators 107*a* and 107*b* through actuation of an adjustable speed drive, a force and/or a direction of motion transmitted to the deck of a vibratory separator may be adjusted. As discussed above, an operator may apply a brake by stopping the weights at any point along their circular rotation. By changing the motion from a circular motion to an elliptical motion, the resultant motion transferred to the vibratory separator deck may thus be changed. In one embodiment, an operator may brake the motion of weights 509*a* and/or 509*b* at 0° or 180° along their path of rotation. Because the shaft that transfers the motion from the actuator to the shaker deck is configured along the actuator's centerline, by braking the motion at 0° or 180°, the sum of vertical components 615*a* and 615*b* imparted to the separator deck may be increased. By increasing the sum of vertical components 615*a* and 615*b*, force transmitted to the separator deck may be increased, thereby providing a modified linear motion.

Those of ordinary skill in the art will appreciate that a specific vibratory profile may be generated wherein the adjustable speed drive only applies a brake to actuators 107*a* and 107*b* according to a specified time interval. in other embodiments, the adjustable speed drive may be used to brake weights 509*a* and 509*b* after a determined number of revolutions. Thus, the resultant motion imparted to the separator deck may include increased linear forces with each rotation, for example by braking weights 509*a* and 509*b* at 0° or 180° with each rotation. However, in alternate embodiments, the resultant motion imparted to the separator deck may be increased after a set number of revolutions by braking weights 509*a* and 509*b*, for example, every third, fourth, fifth, or other defined number of revolutions. By varying the amount of force imparted to the separator deck, the speed of drill cuttings processing, as well as the efficiency of the processing may be controlled. Those of ordinary skill in the art will appreciate that increasing the amount of linear force imparted to the drill cuttings may speed up the processing of cuttings. Accordingly, by increasing the G-forces imparted to the cuttings, conveyance speed may be increased, heavier loads may be processed, separator fluid capacity may be increased, and processing volume may also be increased.

Figure 7:
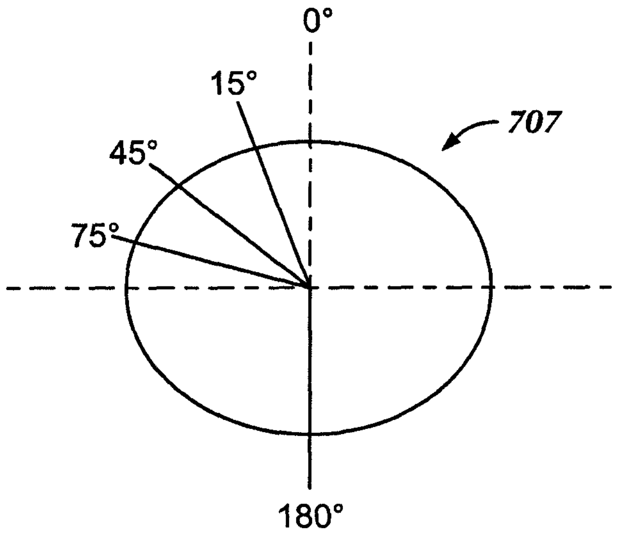
FIG. 7 is a schematic view of a rotational motion of an actuator during operation of a vibratory separator in accordance with an embodiment of the present disclosure.

In addition to providing increased G-forces, embodiments disclosed herein may be used to change the direction of the motion. As discussed above, braking weights 509*a* and 509*b* at 0° or 180° may be used to increase forces transmitted to the separator deck during linear motion. However, by braking weights 509*a* and 509*b* at different points of rotation, a directional components may be added to the resultant motion. Referring briefly to FIG. 7, a schematic view of a rotational motion of an actuator 707 during operation of a vibratory separator in accordance with one embodiment of the present disclosure is shown. For example, by braking weights along the arc of rotation of one or more of the weights of actuator 707, such as at any location other than 0° or 180°, a direction component of the resultant motion may be altered. As illustrated, applying a brake to the weights at, for example 15°, 45°, 75° or another increment may allow the direction of the motion to be changed. The resultant motion applied to the separator deck may include complex motion types, such as balanced elliptical, and may further allow the angle of motion to be modified by changing the location and frequency of the braking of the weights. For example, in one embodiment, one or more weights may be momentarily stopped, so as to induce a 45° angle of motion to the separator deck. In still other embodiments, one or more weights may be momentarily stopped to as to induce other angles of motion, such as 50°, 30°, 75°, or other angles as required for specific operations.

Those of ordinary skill in the art will appreciate that during times of high cuttings flow, the angle may be decreased (e.g., to less than)45° to increase the flow of solids over the separator deck. However, when cuttings flow rates are low, or when it is advantageous to optimize solids removal, produce drier cuttings, or increase fluid recovery, the angle may be increased, so that cuttings remain on the separator deck longer.

Figure 8:
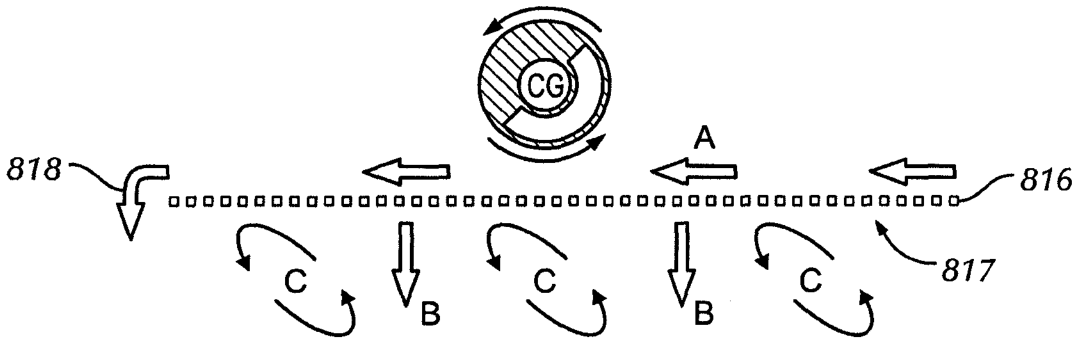
FIG. 8 is a schematic representation of vibratory separator motion according to an embodiment of the present disclosure

Referring to FIG. 8, a schematic of vibratory separator motion according to an embodiment of the present disclosure is shown. In this embodiment, a flow of cuttings is deposited on feed end 816, and flow across vibratory separator 800 in direction A. As the cuttings flow across separator deck 817, liquids are discharged through screens (represented by character reference B), while solids continue across separator deck 817 until they are discharged from solids discharge end 818. The motion imparted to separator deck 817 is illustrated by character reference C, and in this embodiment, is a 45° balanced elliptical motion. Those of ordinary skill in the art will appreciate that the motion is uniform across separator deck 817, and as such, drill cuttings are processed using substantially the same motion across the entire separator deck 817. Additionally, the angle of motion may be modulated by adjusting a braking moment of the weights in the actuators as described above. As such, the angle of motion may be modified according to changes in the cuttings flow rate, or as desired by an operator.

In operation, methods of processing drilling waste disclosed herein may include generating a first vibratory motion on a vibratory separator using at least one motor disposed thereon. As discussed above, the first vibratory motion may include linear, round, or elliptical motion, and may be generated by one or more motors disposed on the vibratory separator. At the discretion of an operator, in response to a changed drilling condition (such as increased flow rate), or in response to a predefined program, a first vibratory motion may be adjusted using an adjustable speed drive, to generate a second vibratory motion. The second vibratory motion may include changing the motion from, for example, a linear motion to an elliptical motion, or may result in changing an angle of motion. Examples of changing an angle of motion may include changing the angle of motion associated with a balanced elliptical motion, or may include increasing force at selected intervals to increase the speed of conveyance of drilling cuttings along the separator deck. In certain embodiments, it may be beneficial to adjust the first vibratory motion by applying a brake to a weight of at least one motor between 0° and 180°, thereby momentarily stopping the rotation of the weights, and thus imparting a directional component to the resultant motion. The braking may last for a defined time interval, for example, 0.5 seconds, and may only occur at selected intervals, for example every 10 revolutions. Those of ordinary skill in the art will appreciate that the time intervals and revolution intervals are exemplary in nature, and in other embodiments, the braking may last for less than or greater than 0.5 second, or occur with less or greater frequency than every 10 revolutions.

Advantageously, embodiments disclosed herein may allow for the control of vibratory separator motion through the use of adjustable speed drives, such as vector control variable frequency drives. Adjustable speed drives may be used to, for example, change the force transferred from an actuator to a separator deck, or in certain embodiments, to change the direction of motion imparted to a separator deck. Thus, unlike current vibratory separators that are only capable of imparting a single type of motion to a separator deck, embodiments disclosed herein may allow multiple motion types to be selected during operation of the vibratory separator. Additionally, current vibratory separators rely on additional motors to impart multiple motion types, effectively turning on or off the additional motors to select a preferred motion type. However, embodiments of the present disclosure may allow for multiple motion types to be selected between by selectively applying a brake through actuation of an adjustable speed drive to one or more of the motors. Thus, advantageously, embodiments disclosed herein may allow for the selection of multiple motion types on a vibratory separator without the need for additional motors.

Moreover, embodiments disclosed herein may advantageously allow for the weights on motors to be decreased. Typical vibratory separators include two or three motors capable of producing one to two horsepower at maximum output. Because the embodiments disclosed herein may allow for increased force in a selected direction, the weights of the motors may be decreased, thereby decreasing the size of motor required for a selected operation.

Additionally, because the size of the motors used may be decreased by decreasing the required weights to produce a desired force, the amount of weight on the structure of the vibratory separator may be decreased. For example, currently, each motor on a vibratory separator may weigh 200 to 250 pounds. By decreasing the size of the weights required, the motor weight may be decreased. Decreasing motor weight will therefore decrease the amount of weight attached to, for example, the side walls or support members of the vibratory separator. By decreasing the weight of the motors, the structural integrity of the vibratory separator may be increased, thereby decreasing normal wear on separator components.

Similarly, decreasing motor size may result in a longer lasting motor, requiring less frequent repairs, thereby decreasing the cost of drilling operations.

Furthermore, while the embodiments disclosed above are specific to oilfield vibratory separators, those of ordinary skill in the art will appreciate that in alternate aspects, industrial mechanical separators may be designed as described above. For example, in certain embodiments, industrial separators, such as those used in the food, pharmaceutical, and chemical industry may benefit from the present disclosure. Moreover, embodiments disclosed herein may be used in any type of separatory apparatus used to separate side solid particles and/or a solid phase from a liquid phase.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A vibratory separator comprising:
a frame;
a basket disposed on the frame;
a motor configured to impart vibratory motion to the basket; and
an adjustable speed drive operatively coupled to the motor to control a vibratory motion imparted to the basket,
wherein the adjustable speed drive is a vector control variable frequency drive.

2. The vibratory separator of claim 1, further comprising:
a second motor configured to impart vibratory motion to the basket.

3. The vibratory separator of claim 2, wherein the adjustable speed drive is operatively coupled to the second motor to control the vibratory motion imparted to the basket.

4. The vibratory separator of claim 2, further comprising:
a second adjustable speed drive operatively coupled to the second motor.

5. The vibratory separator of claim 1, wherein the variable frequency drive controls at least one of a group of drive parameters consisting of speed, torque, direction, and horsepower.

6. The vibratory separator of claim 1, wherein the vibratory motion is at least one selected from a group of motions consisting of linear, elliptical, and round.

7. The vibratory separator of claim 1, wherein the vector control variable frequency drive is a closed loop vector control variable frequency drive.

8. The vibratory separator of claim 1, further comprising:
a programmable logic controller operatively coupled to the adjustable speed drive to provide instructions to control the vibratory motion.

9. The vibratory separator of claim 8, wherein the instructions comprise a time based separatory profile.

10. The vibratory separator of claim 8, wherein the instructions comprise a motion based separatory profile.

11. The vibratory separator of claim 1, further comprising at least one shaft encoder to provide speed information to the adjustable speed drive.

12. The method of claim 1, further comprising an actuator disposed on a side wall of the vibratory separator.

13. A method comprising:
generating a first vibratory motion on a vibratory separator using at least one motor; and
adjusting the first vibratory motion using an adjustable speed drive to generate a second vibratory motion,
wherein the adjusting comprises applying a brake to at least one motor and wherein applying the brake comprises stopping a weight of the at least one motor between 0 and 180 degrees.

14. The method of claim 13, further comprising:
injecting drilling waste into the vibratory separator.

15. The method of claim 13, wherein the second vibratory motion is a balanced elliptical motion.

16. The method of claim 13, wherein the applying the brake is performed at a specified time interval.

17. The method of claim 13, wherein the applying the brake is performed after a determined number of revolutions of at least two unbalanced weights, each unbalanced weight coupled to an actuator, wherein each actuator is driven by one of the at least two rotary motors.

18. An apparatus comprising:
a frame;
a basket disposed on the frame;
at least one screen assembly;
at least two rotary motors configured to impart a vibratory motion to the basket in a linear direction; and
at least two adjustable speed drives operatively coupled to the at least two rotary motors such that a first adjustable speed drive is operatively coupled to a first rotary motor and a second adjustable speed drive is operatively coupled to a second rotary motor to control a vibratory motion parameter of the vibratory separator.

19. The vibratory separator of claim 18, wherein the vibratory motion parameter is a frequency of vibratory motion.

20. The vibratory separator of claim 18, further comprising:
a programmable logic controller operatively coupled to the variable frequency drive to provide instructions to control the vibratory motion.

* * * * *